United States Patent
Belov et al.

(10) Patent No.: US 9,394,448 B2
(45) Date of Patent: Jul. 19, 2016

(54) CHROMATE-FREE CERAMIC COATING COMPOSITIONS

(71) Applicants: Irina Belov, Zionsville, IN (US); Daryl G. Copeland, Greenwood, IN (US)

(72) Inventors: Irina Belov, Zionsville, IN (US); Daryl G. Copeland, Greenwood, IN (US)

(73) Assignee: PRAXAIR S.T. TECHNOLOGY, INC., North Haven, CT (US)

(*) Notice: Subject to any disclaimer, the term of this patent is extended or adjusted under 35 U.S.C. 154(b) by 0 days.

(21) Appl. No.: 14/657,536

(22) Filed: Mar. 13, 2015

(65) Prior Publication Data

US 2015/0183998 A1 Jul. 2, 2015

Related U.S. Application Data (63) Continuation-in-part of application No. 13/673,007, filed on Nov. 9, 2012, now Pat. No. 9,017,464.

(51) Int. Cl.
| | |
|---|---|
| *C09D 5/08* | (2006.01) |
| *C23C 28/04* | (2006.01) |
| *C04B 28/26* | (2006.01) |
| *C04B 28/34* | (2006.01) |
| *C23C 24/08* | (2006.01) |
| *C04B 111/00* | (2006.01) |
| *C04B 111/10* | (2006.01) |

(52) U.S. Cl.
CPC . *C09D 5/08* (2013.01); *C04B 28/26* (2013.01); *C04B 28/34* (2013.01); *C23C 24/082* (2013.01); *C23C 28/04* (2013.01); *C04B 2111/00482* (2013.01); *C04B 2111/00577* (2013.01); *C04B 2111/1075* (2013.01)

(58) Field of Classification Search
CPC .......... C09D 5/08; C23C 24/08; C23C 28/04; C23C 28/34; C23C 30/00
See application file for complete search history.

(56) References Cited

U.S. PATENT DOCUMENTS

| | | | |
|---|---|---|---|
| 3,248,251 A | 4/1966 | Allen | |
| 3,615,781 A | 10/1971 | Schneider et al. | |
| 3,721,574 A | 3/1973 | Schneider et al. | |
| 4,219,358 A | 8/1980 | Hayashi et al. | |
| 5,968,240 A | 10/1999 | Myers et al. | |
| 6,224,657 B1 | 5/2001 | Myers et al. | |
| 6,368,394 B1 | 4/2002 | Hughes et al. | |
| 6,761,934 B2 | 7/2004 | Heimann et al. | |
| 7,789,953 B2 | 9/2010 | Mosser et al. | |
| 7,993,438 B2 | 8/2011 | Mosser et al. | |
| 9,017,464 B2 * | 4/2015 | Belov | C23C 24/08 106/14.21 |
| 2006/0166014 A1 | 7/2006 | Klotz et al. | |

FOREIGN PATENT DOCUMENTS

| | | |
|---|---|---|
| EP | 0142418 A1 | 5/1985 |
| EP | 0295834 A1 | 12/1988 |

OTHER PUBLICATIONS

AlSeal 5000 Data Sheet, www.coatingsforindustry.com, Rev. Jan. 2010.
Mosser et al. "Progress in the Development of Chrome-Free Turbine Engine Coatings". Tri-Service Corrosion Conf. 2007.
Petry et al. "Evaluation of Chromium-Free Alternative Coatings for Aircraft Engine Applications". Tri-Service Corrosion Conf. 2005.

* cited by examiner

*Primary Examiner* — Anthony J Green
(74) *Attorney, Agent, or Firm* — Nilay S. Dalal (57) ABSTRACT

A novel chromate-free multi-layer coating system composed of a lithium-doped potassium silicate binder based basecoat composition that is sealed with an aluminum phosphate-based top coat composition is described. The multi-layer coating system exhibits superior corrosion and heat oxidation resistance which can replace traditional chromate-containing coating systems.

24 Claims, 6 Drawing Sheets

Optical microscopy of chromate-free coating systems:
As-cured Top coating B (a) and Top coating D (b) on Class 4 basecoat FIG. 1(a)         FIG. 1(b)

Chromate-free coating system after Boiling $H_2O$ exposure:
Bend and cross-hatch (optical microscope X6) adhesion of top coating A on Class 3
(a) and Class 4 (b) basecoat

Chromate-free coating system of top coating A on Class 4 basecoat: after bend test
(a) followed by Salt Spray exposure for 400 hours (b) and 720 hours (c)

FIG. 3(a)  FIG. 3(b)  FIG. 3(c)

Chromate-free coating systems on Class 4 basecoat:
As-cured Top coating B (a) and Top coating D (b) after cross-hatch and bend adhesion tests

Chromate-free coating systems on Class 4 basecoat after Boiling H$_2$O exposure:
Cross-hatch and bend adhesion tests for Top coating B (a) and Top coating D (b)

Salt Spray Test of chromate-free coating system: Top Coating B on Class 4 basecoat
after 1,100 hours (a), after 1,700 hours (b), after 2,300 hours (c)

FIG. 6(a)  FIG. 6(b)  FIG. 6(c)

Salt Spray Test of chromate-free coating system: Top Coating D on Class 4 basecoat after 1,100 hours (a), after 1,700 hours (b), after 2,500 hours (c)

FIG. 7(a)    FIG. 7(b)    FIG. 7(c)

Cyclic Heat + Salt Spray test after 10 cycles:
Top Coating A (a) and D (b) on Class 4 basecoat FIG. 8(a)    FIG. 8(b)

Cyclic Heat + Salt Spray + 96% Humidity test after 10 cycles:
Top Coating A (a) and D (b) on Class 4 basecoat FIG. 9(a)    FIG. 9(b)

Chromate-free Coating systems After Heat Oxidation Resistance 1100°F for 1030 hours:
Top Coating A (a) and D (b) on Class 4 basecoat FIG. 10(a)    FIG. 10(b)

Chromate-free Coating systems after Heat Exposure followed by Salt Spray Exposure:
Top Coating C as-cured (a), after heat 1075°F / 4 hours (b), then 168 hours Salt Spray (c)
Top Coating D as-cured (d), after heat 1075°F / 4 hours (e), then 335 hours Salt Spray (f)

Chromate-free basecoat only after Salt Spray Exposure for 1000 (a) and 1700 hours (b)

FIG. 12(a)     FIG. 12(b)

CHROMATE-FREE CERAMIC COATING COMPOSITIONS

RELATED APPLICATIONS

This application is a continuation-in-part of U.S. application Ser. No. 13/673,007, filed on Nov. 9, 2012, now U.S. Pat. No. 9,017,464, issued Apr. 28, 2015 which is hereby incorporated by reference in its entirety.

FIELD OF THE INVENTION

The present invention relates to novel chromate-free slurries that are suitable in the production of protective coating systems formed by novel silicate-based basecoats and sealed with aluminum phosphate-based top coats; these coating systems exhibit superior corrosion and heat resistance and capable of replacing traditional chromate-containing coating systems.

BACKGROUND OF THE INVENTION

Chromium (VI)-based aluminum-ceramic coating compositions have been well known and considered for decades as the industry standard for forming coatings which are highly corrosion-resistant and heat-resistant. U.S. Pat. No. 3,248,251 to Allen over forty years ago recognized and described the ability of aluminum-ceramic chromate-based coatings to exhibit resistance to corrosion, heat and abrasion while retaining adhesion and flexibility. Such attributes have continued to make aluminum-ceramic coatings widely used in a variety of applications. Today, these coatings are relied upon by original equipment manufacturers (OEM's) in the aircraft and power generation industries for protection of various turbine components subject to high temperature and corrosive environments. Department of Defense (DoD) depot facilities also use aluminum-ceramic coatings as part of their manufacturing for critically needed items. Additionally, the automotive industry and various other industries routinely use aluminum-ceramic coatings as a high performance protective coating.

The conventional aluminum-ceramic coating typically consists of an acidic chromate-phosphate binder that is filled with metallic aluminum powder. Upon curing, the binder forms a matrix that is embedded with the aluminum particles. The matrix provides mechanical integrity to the coating, while the chromate passivated aluminum pigment network imparts efficient corrosion protection. Burnishing Al-filled coating by dry grit or glass bead-blasting compresses the coating to render it conductive, galvanically active and sacrificial (i.e., cathodically protective) to all steels. SermeTel W® is recognized in the industry as the performance standard for these types of coatings. Depending on the particular application and service conditions, the coating can be used alone to provide adequate corrosion protection, or alternatively, the coating can be utilized as a part of an overlay system, serving as a basecoat that is sealed with top coatings and/or sealers. By sealing porosity and voids in the basecoat, the top coating provides additional barrier protection, thereby extending the corrosion protective action of the whole overlay system, as well as enhancing its other functional properties (e.g., smoothness, hot water resistance, heat oxidation resistance, engine fluids resistance, etc.) and its visual appearance.

Inorganic binder based top coats for high temperature resistant coating systems, as known in the art, are customary formed by a chromate-phosphate binder solution similar to that of the basecoat, but containing no metal particles. The topcoat composition may further contain metal oxide pigments that are chemically inert and heat resistant (such as $Al_2O_3$, $TiO_2$, $Cr_2O_3$, multicomponent oxide spinels, etc.). Upon curing, the top coat forms a thin glass-ceramic type layer thus providing additional functional advantages.

In response to the identification of hexavalent chromium Cr(VI) as an environmentally hazardous material, various Cr-free aluminum ceramic base coats in combination with top coats have been investigated as potential environmentally benign replacement coating systems. Extensive efforts were placed into an approach which employed phosphoric acid based binders for both basecoat (filled with aluminum metal particles) and top coat compositions (pigment-free or filled with oxide pigments), as described in U.S. Pat. No. 5,968,240 to Myers et. al.; U.S. Pat. No. 6,224,657 to Myers et. al; U.S. Pat. No. 6,368,394 to Hughes et. al.; and U.S. Pat. No. 7,993,438 to Mosser et. al. For instance, one alternative Cr-free coating system of U.S. Pat. No. 7,993,438 considered is an aluminum ceramic basecoat layer having a phosphate-based binder. The coating when employed in conjunction with phosphoric-acid binder based Cr(VI)-free top coating such as in U.S. Pat. No. 6,224,657, provides application properties (e.g., thickness, roughness, galvanic activity) and performance (e.g., salt spray corrosion resistance, high temperature heat oxidation resistance, erosion resistance, mechanical properties) that meets OEM Specifications (although still not fully equal to the benchmark coating systems with SermeTel W® basecoat). However, as a stand-alone basecoat, the coatings developed red rust in the scribe and the field when subject to the Salt Spray test per ASTM B117 testing of up to 1000 hrs. Another drawback of this approach stems from a significant interaction of aluminum particles with the phosphate binder of the prior art in a water-based slurry in the absence of Cr(VI) species that have a passivating effect on aluminum metal. As a result of this adverse interaction of the aluminum particles with the phosphate binder, the basecoat slurry cannot be maintained as a "one-part" composition, in which all of the constituents can be mixed together into a single formulation, without one or more of the constituents adversely affecting other constituents of the composition. Rather, the slurry must be maintained in storage as a two-part slurry, in which the aluminum powder is maintained separate from the aqueous binder, until the point of use when the binder and Al can be mixed. However, the pot life of the mixed slurry is only about 8 hours, beyond which a rapid deterioration of the mixture is observed, that manifests itself in agglomeration of Al particles leading to a significant increase in the particle size. Although some specific modifications to the aluminum ceramic coatings employing phosphate-based binders can improve the pot life to over 24 hrs, the slurries must undesirably remain a two-part slurry to avoid the adverse interaction of the aluminum particles with the phosphate binder. To overcome the above problems, Applicants' U.S. patent application Ser. No. 13/673,007 relates to novel basecoat compositions exhibiting superior corrosion and heat resistance and capable of replacing traditional chromate-containing coatings. Specifically, as disclosed in U.S. patent application Ser. No. 13/673,007, Applicants discovered that utilizing a chromium-free silicate-based binder that is lithium-doped potassium silicate in combination with an aluminum powder produces a ceramic coating exhibiting improved functional properties, in particular long-term resistance to corrosion and heat exposure while retaining adhesion and flexibility. The coating layer is continuous, dense and defect-free. The slurry can contain both the Al powder and the binder so that the starting material is a one-part composition in which all constituents are pre-mixed as a single formulation. The one-part composition remains sufficiently stable to exhibit long shelf-life.

In a first aspect U.S. patent application Ser. No. 13/673,007 is directed to an aqueous slurry composition for the production of a coating on a substrate is provided. The composition comprises an aqueous binder comprising a lithium-doped potassium silicate solution in water. The binder is characterized by an absence of chromium. The slurry further includes an aluminum or aluminum alloy powder, wherein the aluminum or aluminum alloy powder comprises a particle size distribution characterized in that the 50$^{th}$ percentile of the particle size distribution has a diameter of between about 4 to 7 microns and the 90$^{th}$ percentile of the particle size distribution has a diameter of less than or equal to about 11.5-15.5 microns. The aluminum or aluminum alloy powder and the binder are contained as a one-part composition, each of which is contained in a predetermined weight ratio.

In a second aspect, U.S. patent application Ser. No. 13/673,007 is directed to an aqueous slurry composition for the production of a coating on substrate. The composition comprises an aqueous binder comprising a lithium-doped potassium silicate solution in water. The binder is characterized by an absence of chromium. The slurry further includes an aluminum or aluminum alloy powder contained as a one-part composition. The aluminum or aluminum alloy powder content in the slurry is between about 30-50 weight percent (wt %) based on the total weight of the slurry and further comprises a particle size distribution characterized in that the 50$^{th}$ percentile of the particle size distribution has a diameter of between about 3.9 to 4.5 microns and the 90$^{th}$ percentile of the particle size distribution has a diameter of less than or equal to about 9.0 microns.

In a third aspect, U.S. patent application Ser. No. 13/673,007 is directed to an aqueous slurry composition for the production of a coating on a substrate. The composition comprises an aqueous binder comprising a lithium doped potassium silicate solution in water. The binder is characterized by an absence of chromium. The slurry further includes aluminum or aluminum alloy powder incorporated into the binder as a one-part composition. The lithium-doped potassium silicate comprises potassium and lithium in a ratio of about 3:1 to 20:1 by weight as $K_2O:Li_2O$, and the ratio of silicate to potassium is in a ratio of about 2:1 to 3:1 by weight as $SiO_2:K_2O$.

In a fourth aspect, U.S. patent application Ser. No. 13/673,007 discloses a coating composition for a substrate comprising a ceramic matrix not containing chromium. The ceramic matrix is formed by a silicate binder and a plurality of aluminum powder particles embedded within the matrix. The silicate binder is potassium silicate doped with lithium. The aluminum powder comprises a particle size distribution characterized in that the 50$^{th}$ percentile of the particle size distribution has a diameter of between about 4 to 7 microns, and the 90$^{th}$ percentile of the particle size distribution has a diameter of less than or equal to about 11.5-15.5 microns.

In a fifth aspect, U.S. patent application Ser. No. 13/673,007 discloses a coating composition for a substrate comprising a ceramic matrix not containing chromium. The ceramic matrix is formed by a silicate binder and a plurality of aluminum powder particles embedded within the matrix. The silicate binder is potassium silicate doped with lithium. The aluminum powder comprises a particle size distribution characterized in that the 50$^{th}$ percentile of the particle size distribution has a diameter of between about 3.9 to 4.5 microns, and the 90$^{th}$ percentile of the particle size distribution has a diameter of less than or equal to about 9.0 microns.

Although the above lithium-doped potassium silicate binder based basecoat, as described in the parent U.S. patent application Ser. No. 13/673,007, has sufficiently good functional performance when used as a stand-alone coating, it would be desirable to achieve additional enhancement of the functional properties of the chromium-free basecoats disclosed in the parent U.S. patent application Ser. No. 13/673,007, such as, by way of example, increased corrosion protection, water resistance, heat oxidation resistance, etc. by employing these basecoats in conjunction with protective top coatings.

Chromate-free lithium-doped potassium silicate binder based basecoats of the parent U.S. patent application Ser. No. 13/673,007 demonstrate significant advantages to the Cr-free basecoat compositions of the prior art, hence there is further need to develop top coating compositions that are compatible with these basecoats. This, in turn, will allow creation of chromate-free basecoat-top coat coating systems with improved functional properties, including corrosion, heat and oxidation resistance.

SUMMARY OF THE INVENTION

The invention relates, in part, to slurries used to produce coating compositions with special properties. It has been found that utilizing a chromium-free silicate-based basecoat that is sealed with an aluminum phosphate-based top coat produces a multi-layer coating system exhibiting superior corrosion and heat resistance and which is capable of replacing traditional chromate-containing coating systems.

In a first aspect, aqueous slurries compositions for the production of a multilayer coating system on a substrate comprising: a basecoat slurry, comprising: a binder comprising an aqueous solution of lithium doped potassium silicate, the binder characterized by an absence of chromium; and an aluminum or aluminum alloy powder incorporated into the binder, wherein the aluminum or the aluminum alloy powder and the binder are contained as a one-part composition; wherein the aluminum or aluminum alloy powder comprises a particle size distribution characterized in that the 50$^{th}$ percentile of the particle size distribution has a diameter of between about 4 to 7 microns and the 90$^{th}$ percentile of the particle size distribution has a diameter of less than or equal to about 11.5-15.5 microns; and a topcoat slurry wherein said topcoat slurry comprises an aqueous solution of an aluminum phosphate based binder having a molar ratio of $Al:PO_4$ of higher than about 1:3.

In a second aspect, aqueous slurries compositions for the production of a multilayer coating system on a substrate comprising: a basecoat slurry, comprising: a binder comprising an aqueous solution of lithium doped potassium silicate, the binder characterized by an absence of chromium; and an aluminum or aluminum alloy powder incorporated into the binder, wherein the aluminum or the aluminum alloy powder and the binder are contained as a one-part composition; wherein the aluminum or aluminum alloy powder content in the slurry is between about 30-50 weight percent (wt. %) based on the total weight of the slurry and further comprises a particle size distribution characterized in that the 50$^{th}$ percentile of the particle size distribution has a diameter of between about 3.9 to 4.5 microns and the 90$^{th}$ percentile of the particle size distribution has a diameter of less than or equal to about 9.0 microns; and a topcoat slurry, wherein said topcoat slurry comprises an aqueous solution of an aluminum phosphate based binder having a molar ratio of $Al:PO_4$ of higher than about 1:3.

In a third aspect, aqueous slurries compositions for the production of a multilayer coating system on a substrate, comprising: a basecoat slurry, comprising: a binder comprising an aqueous solution of lithium doped potassium silicate, the binder characterized by an absence of chromium; and an aluminum or aluminum alloy powder incorporated into the binder, wherein the aluminum or the aluminum alloy powder and the binder are contained as a one-part composition; wherein the lithium-doped potassium silicate comprises potassium and lithium in a ratio of about 3:1 to 20:1 by weight as $K_2O:Li_2O$, and further wherein the ratio of silicate to potassium is in a ratio of about 2:1 to 3:1 by weight as $SiO_2:K_2O$; and a topcoat slurry, wherein said topcoat slurry comprises an aqueous solution of an aluminum phosphate based binder having a molar ratio of $Al:PO_4$ of higher than about 1:3.

In a fourth aspect, a multilayer coating composition for a substrate, comprising: a basecoat, comprising: a ceramic matrix not containing chromium, said matrix formed by a silicate binder and a plurality of aluminum powder particles embedded within said matrix; wherein said silicate binder is potassium silicate doped with lithium; wherein the aluminum powder comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns; and a topcoat comprising a matrix formed by curing an aluminum phosphate based binder having a molar ratio of $Al:PO_4$ of higher than about 1:3.

In a fifth aspect, a multilayer coating composition for a substrate comprising: a basecoat, comprising: a ceramic matrix not containing chromium, said matrix formed by a silicate binder and a plurality of aluminum powder particles embedded within said matrix; wherein said silicate binder is potassium silicate doped with lithium; wherein the aluminum powder comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns; and a topcoat comprising a matrix formed by curing an aluminum phosphate based binder having a molar ratio of $Al:PO_4$ of higher than about 1:3.

BRIEF DESCRIPTION OF THE DRAWINGS

The specification contains at least one photograph executed in color. Copies of this patent or patent publication with color photograph(s) will be provided by the Office upon request and payment of the necessary fee. The objectives and advantages of the invention will be better understood from the following detailed description of the preferred embodiments thereof in connection with the accompanying figures wherein like numbers denote same features throughout and wherein:

FIG. 2(a) shows results for top coating A on a Class 3 basecoat and FIG. 2(b) shows results for top coating A on a Class 4 basecoat;

DETAILED DESCRIPTION OF THE INVENTION

The relationship and functioning of the various elements of this invention are better understood by the following detailed description. However, the embodiments of this invention as described below are by way of example only.

The present invention recognizes that employment of a top coat raises a concern of chemical compatibility between a basecoat and a top coat. In particular, during topcoat application, the liquid slurry is coming in direct contact with the previously applied basecoat layer. Hence, for a top coat to provide additional protection and overall enhancement of functional performance of the coating system, this contact of the top coat slurry with the basecoat layer should not cause any deleterious chemical interaction neither with aluminum metal particles nor with a binder matrix of the basecoat. Accordingly, the selection of a compatible topcoat and basecoat layer is a consideration that has not been successfully addressed until emergence of the present invention.

Because the basecoat of Applicants' invention in the U.S. patent application Ser. No. 13/673,007 employs chromate-free lithium-doped potassium silicate binder, as opposed to the chromate-free phosphate-based basecoat binder of the prior art, the chromate-free phosphoric-acid based top coatings of the prior art may not be chemically compatible with the basecoat of the present invention. For instance, according to the prior art a chromate-free top coating composition of U.S. Pat. No. 6,224,657 was efficient in enhancing functional properties of a chromate-free phosphate-based basecoat composition of U.S. Pat. No. 7,993,438. However, Applicants have observed that application of the prior art top coating slurry of U.S. Pat. No.6,224,657 onto the basecoat of Applicants' invention, created an overlay system that performed poorly: severe blistering of the coating was observed after about 250 hours of Salt Spray exposure. As such, it was concluded that, the top coating composition of the prior art was not chemically compatible with the silicate-based matrix of the basecoat of the present invention.

Aqueous compositions of the chromate-free basecoats and top coats of the present invention can be used to apply a protective overlay system onto various solid substrates, including, by way of example, ferrous alloys, nickel alloys, nickel-cobalt alloys, and other metallic (such as aluminum alloys, cobalt alloys, etc.) and nonmetallic thermally stable surfaces (such as ceramics). While ferrous alloy substrates are preferred, any solid substrate may be suitable for the application of the coating of the present invention, on the condition that the solid substrate is preferably capable of withstanding coating processing temperatures of about 650° F.

In accordance with one aspect of the present invention, an aqueous slurry composition is provided for application of a top coating /sealant on the surface of the Cr-free lithium-doped potassium silicate basecoat described in the parent U.S. patent application Ser. No. 13/673,007. The top coating slurry comprises an aluminum phosphate based binder and a metal oxide pigment. The molar ratio of Al:$PO_4$ in the aluminum phosphate binder is higher than 1:3 and can range from 1:2.1 to 1:2.9, more preferably from 1:2.2 to 1:2.8, and most preferably from 1:2.4 to 1:2.7.

It has been discovered in the present invention, as will be shown in the examples, that employing an aluminum phosphate based binder composition with a metal oxide pigment incorporated therein, wherein the binder comprises Al and $PO_4$ species in this molar ratio range, provides a top coating slurry that is chemically compatible with the basecoat. The basecoat employs a lithium-doped potassium silicate binder with aluminum powder incorporated therein. It was found that application of such top coating provided significant enhancement of functional properties (e.g., corrosion resistance, corrosion-heat resistance), as well as reduced surface roughness and increased water resistance of said basecoat. As used herein and throughout the specification, the term "chemically compatible" means that there is no adverse chemical interaction taking place between a top coating slurry and lithium doped potassium silicate matrix and/or metal aluminum particles which constitute the basecoat layer; such adverse chemical interaction could lead to deterioration in functional performance of a coating system.

Aluminum dihydrogen phosphate $Al(H_2PO_4)_3$ with a molar ratio of Al:$PO_4$ of 1:3 is well known in the art as an efficient bonding agent for various ceramic materials (A. S. Wagh, Chemically Bonded Phosphate Ceramics, 2002) and is widely used in the refractory industry. $Al(H_2PO_4)_3$ hydrate salt is water soluble and forms highly concentrated (~50%) acidic aqueous solutions that makes this reagent very suitable for manufacturing aqueous slurries. When $Al(H_2PO_4)_3$ is heated, it loses water and a number of complex hydrates are formed; under further heat treatment, these complex hydrates decompose to form amorphous and crystalline aluminum phosphate phases with different stoichiometry. Although various possible heat induced transformation paths from aluminum dihydrogen phosphate solution to anhydrous aluminum metaphosphate $Al(PO)_3$ and orthophosphate $AlPO_4$ phases were given in the literature, it is known in the art that the temperatures required to produce completely anhydrous phases are close to 500° C. (~930° F.), and subsequent transformations of anhydrous aluminum phosphate phases take place up to temperatures as high as 750° C. (~1380° F.) (e.g., see, M. Vipola et. al., J. Eur. Ceram. Soc., 22, 2002, pp. 1937-1946). This high temperature range of heat transformation completion for aluminum dihydrogen phosphate solution is common and acceptable for ceramics and refractories manufacturing—these types of materials are customarily sintered at high temperatures of about 1000° C. and higher. However, Applicants recognize that $Al(H_2PO_4)_3$ with a molar ratio of Al:$PO_4$=1:3 is not suitable to serve as a binder for the top coatings of the present invention with customary cure temperatures in the range of 600° F. to 1000° F. Heat transformations continuing above this temperature range would lead to volume changes in the matrix, mechanical stresses in the coating and thus loss of adhesion with the basecoat under service conditions.

It was unexpectedly discovered in the present invention that increasing the molar ratio of Al:$PO_4$ from 1:3 of the aluminum dihydrogen phosphate has resulted in a significant change of its heat transformation path so as to lead to a reduction of the temperatures of completion of these transformations. Table 1 presents results of the thermal analysis of aluminum dihydrogen phosphate based binders with Al:$PO_4$ ratio increased to 1:2.7 and 1:2.4, in comparison with the stoichiometric aluminum dihydrogen phosphate with Al:$PO_4$=1:3. Aqueous solutions of aluminum dihydrogen phosphate based binders with different molar ratio of Al:$PO_4$ were cured at 400° F. and 650° F. for 1 hour; then the thermal analysis (TG and DSC) was performed (Universal V4.5A TA thermal Analyzer, heating in air from room temperature to 700° C. (1292° F.) at a rate of 10° C./min) to determine residual weight loss and peak temperatures of thermal effects.

TABLE 1

Thermal analysis of cured aluminum phosphate binders

| Molar ratio Al:$PO_4$ | Cure 400° F./1 hr | | | Cure 650° F./1 hr | | |
|---|---|---|---|---|---|---|
| | Weight loss*, % | Thermal Effects | | Weight loss*, % | Thermal Effects | |
| | | 1 | 2 | | 1 | 2 |
| 1:3 | 16.20 | 482° F. | 972° F. | 7.32 | none | 982° F. |
| 1:2.7 | 11.70 | 471° F. | none | 3.72 | none | none |
| 1:2.4 | 5.28 | none | none | 2.23 | none | none |

*Total weight loss when heated to 700° C. (1292° F.)

As seen from the data of Table 1, an increase in aluminum content in aluminum phosphate based binder solutions from Al:$PO_4$=1:3 of stoichiometric aluminum dihydrogen phosphate to Al:$PO_4$=1:2.7 and further to Al:$PO_4$=1:2.4 results in significant decrease of residual weight loss of the analyzed cured binders, as well as in disappearance of endothermic effects related to dehydration of phosphate phases. These results indicate that the above increase in aluminum content has led to a reduction of the temperatures of completion of the heat induced transformations as compared to the stoichiometric aluminum dihydrogen phosphate of molar ratio Al:$PO_4$=1:3, thereby achieving a complete cure at temperatures in the range of 600° F. to 1000° F. As a result, this compositional modification makes these solutions suitable to serve as binders for the top coatings of the present invention. It was found in the present invention and as will be demonstrated in the Examples, that aluminum phosphate binders of the present invention provided excellent adhesion, very good chemical compatibility with the basecoat of the present invention and significant enhancement of functional properties of the overall coating system.

The Aluminum required to increase Al:$PO_4$ molar ratio can be supplied by any suitable aluminum containing raw material that is soluble in concentrated (~20-50 wt. %) acidic aqueous solution of aluminum dihydrogen phosphate, such as aluminum hydroxide, aluminum nitrate, etc. It was found by Applicants that it was desirable to keep the pH of the top coating slurries of the present invention in the range of about 1.7-1.9 when the molar ratio of Al:$PO_4$ is about 1:2.7 and in the range of pH of about 1.4-1.6 when the molar ratio of Al:$PO_4$ is about 1:2.4. Depending on the employed source of aluminum ions, further pH adjustment may be required. For instance, when aluminum hydroxide Al$(OH)_3$ is used to increase Al:$PO_4$ molar ratio to 1:2.7, no pH adjustment is needed. However, when an acidic aqueous solution of Al nitrate is used as a source of Al ions to adjust the Al:$PO_4$ molar ratio to 1:2.4, a resultant pH lower than the desirable range can occur, thereby requiring additional pH adjustment. This pH adjustment can be done with any suitable basic compound that is soluble in the top coating binder, such as, for instance, magnesium hydroxide or magnesium carbonate and the like, and upon dissolving therein is capable of increasing the pH of the solution.

The topcoat slurry composition further comprises metal oxide pigment particles; these are preferably micron-sized particles that are chemically inert and heat resistant (such as $Al_2O_3$, $TiO_2$, $Cr_2O_3$, multicomponent oxide spinels, and the like). The pigment particles are insoluble in the binder and form an aqueous dispersion. A choice of a particular suitable metal oxide pigment or a mixture of pigments is determined, at least in part, by imparting specific and desirable functional properties of a top coating and the coating system as a whole. As an example, green Cr(III) oxide compound $Cr_2O_3$ that has extraordinary chemical and thermal resistance, when incorporated into the binder, provides high heat oxidation resistance of the whole coating system. The preferred Al:$PO_4$ molar ratio in the aluminum phosphate based binder remains unchanged with the pigment addition (i.e., the binder is prepared first, and then the pigment is added to this binder with the defined Al:$PO_4$ molar ratio).

Optionally, small additions (~1-2 wt. %) of colloidal or fumed (so-called pyrogenic) metal oxides to the top coating slurry composition can be employed. These metal oxides, such as fumed silica $SiO_2$, fumed alumina $Al_2O_3$ or fumed titania $TiO_2$ are composed of fine primary nanoparticles that range in size from about 5 nm to about 100 nm. Contrary to micron-sized metal oxide pigment particles, these colloidal or fumed oxide particles are not fully inert in aqueous binder solutions and in particular, in the binder solutions of the present invention. Furthermore, because the colloidal or fumed oxide particles have very high surface areas (up to 100 $m^2$/gram and higher), they are prone to formation of various surface active phases, and these phases might have an impact on the properties of a cured coating. Fumed metal oxides may be produced by pyrogenic processes and are commercially available under trade names of Cab-O-Sil® (Cabot Corporation) or AeroSil® and Aeroxide® (Evonic Degussa Corporation) and the like. It was determined by Applicants that, the addition of about 1 weight % of Cab-O-Sil® M5 fumed silica was beneficial, and surprisingly the addition of Aeroxide® $TiO_2$ (of about 1 weight % ?)was more beneficial for further enhancement of functional performance of the coating system of the present invention.

In other embodiments, non-oxide ceramic powders, can be employed in the aluminum phosphate based binders of the present invention. The choice of a particular ceramic material can be dependent upon numerous factors, including the intended service conditions of a coated part. By way of example, but not intending to be an exhaustive list, these ceramic materials incorporated into the binder of the present invention can include silicon carbide, boron nitride or graphite powders.

The balance of the top coat slurry compositions of the present invention constitutes water, which dissolves aluminum dihydrogen phosphate, as well as aluminum compounds employed to increase the Al:$PO_4$ molar ratios, and adjust pH.

Optionally, other functional additives known in the art can be incorporated into the binder. By way of example, small amount (~1-2 wt. %) of boron oxide $B_2O_3$ can be introduced into the binder solution. It is well known in the art of ceramics and glass ceramics that the physical and the mechanical properties of aluminum phosphate binders are improved by $B_2O_3$ modification, probably due to formation of boron phosphate $BPO_4$ and/or boron aluminum phosphate phases. For instance, U.S. Pat. No. 4,089,692, which is incorporated herein by reference in its entirety, relates to refractory molds compositions and discloses that addition of boron to the refractory mold composition leads to increase in tensile strength of the molds, as well as discloses aluminum phosphate water solutions which exhibit greatly increased shelf stability as compared to aluminum phosphate materials which do not contain boron. In another source, it is stated that the strength of porcelain is known to considerably increase by addition of $BPO_4$ (R. F. Silval, et. al. in Bol. Soc. Esp. Ceram. V., 43 [2], 2004, pp. 259-262, which is incorporated herein by reference in its entirety,).

Surfactants, as well as small additions of suitable organic solvents known in the art can also be employed to improve properties, such as, for example, slurry sprayability, substrate wetting and film forming properties.

The slurry compositions of the present invention can be applied to a substrate by any number of conventional application techniques known in the art, such as by spraying, brushing, dipping, dip-spinning and the like. The applied layer is dried, and then cured. The binder solution polymerizes and solidifies under a drying and curing cycle to form a continuous matrix with acceptable mechanical strength, flexibility and chemical resistance. Aluminum particles are embedded in the matrix of the basecoat, and metal oxide particles are embedded in the matrix of the top coat. As evident to one of skill in the art, applicable curing regimes may include higher temperatures for shorter time or lower temperatures for longer time.

To form the coating systems of the present invention, after the Li-doped K silicate binder basecoat slurry is applied to a substrate, dried and cured to form a basecoat layer, as described in the parent U.S. application Ser. No. 13/673,007, the basecoat layer is treated to make it electrically conductive by any of the treatments widely used in the art for this purpose, such as, for example, burnishing with an abrasive media, such as aluminum oxide grit, at low processing pressure or heating at temperatures of about 1000° F. The treatments therefore render the inventive coatings galvanically protective against corrosion to an underlying substrate.

It is recognized in the art that a basecoat burnishing step with the abrasive media can be carried out in two different process steps sequences. If the burnishing is performed after the first cured layer of the basecoat, then this type of activation of the basecoat is commonly referred to as Class 3, and if the burnishing step is performed after the second cured layer of the basecoat, this process sequence is commonly referred to as Class 4 activated basecoats.

The effect of the Li-doped potassium silicate base coat burnishing with abrasive media was investigated and described in detail in the parent U.S. application Ser. No. 13/673,007. Generally speaking, the energy imparted to the coating from the pressurized media particles during the burnishing results in flattening of the aluminum particles and densification of the coating, thus creating partial closure of the pores. These changes provide continuous contact between the aluminum particles, thereby rendering the coatings conductive (e.g., measurements of less than 5Ω can be typically obtained); the electrical resistance of grit-burnished coatings is measured by a standard resistivity meter with the probes being placed on the surface of the coating one inch apart.

The base coat of the coating system of the present invention is generally applied to a thickness of between 0.5 to 3.0 mils, with a preferable thickness between 1.0 to 1.5 mils. Such a coating thickness can be built up in one layer (i.e., one application-drying-curing cycle), or preferably in two layers with two cure cycles. The minimum thickness is determined by a need to provide a continuous layer covering a substrate. The maximum thickness of the basecoat layer is generally determined by a targeted or specified thickness of the entire multilayer overlay system. It is customary and desirable not to apply a coating in excess of functional requirements for a particular application. For example, typical multilayer coating system thickness on some turbine components (such as, for example, compressor blades and vanes) should be less than 2 mils.

The top coating slurries of the present invention are then applied to the base coat to form the coating systems of the present invention. In a preferred embodiment, the top coating is applied to a thickness of between 0.1 to 0.5 mils, with a more preferable thickness between 0.1 to 0.3 mils.

The curing regime required for the top coatings of the present invention can be in the range from 650° F. for 0.5 hour to 1000° F. for 1.0-1.5 hour, depending on a particular choice of the top coating binder composition.

It was discovered in the present invention that by varying the molar ratio of $Al:PO_4$ in the top coating binder composition, control of the long-term heat oxidation resistance of the coating system can be attained. Generally speaking, the higher the $Al:PO_4$ molar ratio, the more temperature resistant is the coating system of the present invention. Thus, depending on the $Al:PO_4$ molar ratio of the top coating slurry binder, two major groups of chromate-free coating systems have been designed by the inventors. Group 1 coatings are characterized by the top coating binder with $Al:PO_4$ molar ratio of about 1:2.7 and intended for continuous service temperatures up to 900° F., while Group 2 coatings are characterized by the top coating binder with $Al:PO_4$ molar ratio of about 1:2.4 and designed to withstand continuous service temperatures up to 1150° F.

Choice of a top coating over the base coat is determined by a combination of factors, including particular service conditions, type of a substrate/part and performance requirements. For instance, high and ultrahigh strength steels (such as so-called maraging steels) used for some turbine components have service temperature limitations and cannot endure continuous service temperatures higher than about 850° F.; thus turbine components made of the high-strength steels are not exposed to the temperatures higher that this limit, with customary service temperatures of these components being up to 700° F. This means that suitable corrosion protective coatings for these substrates are chosen from Group 1. For other turbine components that are exposed to the service temperatures up to 1000° F.-1100° F., suitable protective coating systems with the Group 2 top coating are chosen.

The surface morphology of the chromate-free coatings systems of the present invention will now be described. The coating systems composed by the Li-doped potassium silicate based aluminum ceramic basecoat and various aluminum phosphate based top coatings of the present invention were applied as follows: different substrates (1010 low-carbon steel, 4130 low-alloy steel, 410 stainless steel) were grit-blasted with 100 mesh grit; sprayed with the base coat slurry; dried at 175° F. for 15 min; and then cured at 650° F. for 0.5 hour. The base coat was applied in two layers (with two cure cycles) to a total thickness of 1.1-1.5 mils. To render the basecoats conductive (hence capable of providing sacrificial corrosion protection), the cured coatings were grit-burnished with 220 mesh $Al_2O_3$ media after applying and curing the first or the second basecoat layer. Correspondingly, Class 3 and Class 4 activated basecoats were formed. Several different top coat slurries were then applied to achieve a total thickness of 0.1-0.3 mils; dried at 175° F./15 min; and cured at 650° F. for 0.5 hour or at 1000° F. for 1.0 hour.

Figure 1A:
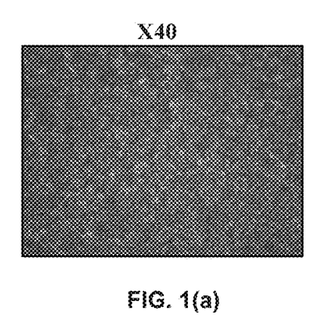
FIGS. 1(a) and 1(b) illustrate surface morphology of chromate-free coating systems of the present invention (optical microscopy at a magnification of ×40): 1(a) shows as-cured Top coating B applied on the Li-doped K silicate binder based basecoat layer and 1(b) shows as-cured Top coating D applied on the Li-doped K silicate binder based basecoat layer.
Figure 1B:
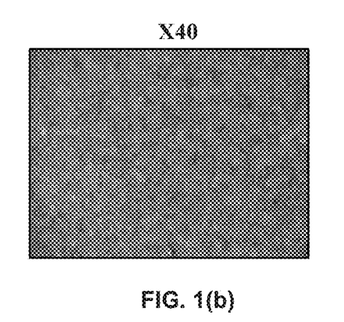

Visual appearance and optical microscopy data of chromate-free coating systems of the present invention with top coatings of different aluminum phosphate based binder composition and pigment choice (see Table 2 for representative systems) demonstrate formation of dense, smooth and defect-free layers (FIGS. 1a, b). The surface finish (smoothness) of the coatings Ra was measured by Mitutoyo Surftest 301 (at a 5.1 mm traverse and 0.030" (0.76 mm) cutoff).

TABLE 2

Some of the top coatings employed in the chromate-free coating systems

| Top Coating | Color | Oxide pigment | Al:PO$_4$ molar ratio | Cure Temperature | Ra, μin |
|---|---|---|---|---|---|
| A | Green | Cr$_2$O$_3$ | 1:2.7 | 650° F. | 30-35 |
| B | Green | Cr$_2$O$_3$ | 1:2.4 | 1000° F. | 25-35 |
| C | Grey | TiO$_2$ | 1:2.7 | 650° F. | 15-25 |
| D | Grey | TiO$_2$ | 1:2.4 | 1000° F. | 25-35 |

Coating adhesion to a substrate and interlayer adhesion of the coating systems were tested by cross-hatch tape adhesion test (per ASTM D3359) and bend test (90° bend around a 0.22" diameter mandrel). In accordance with the ASTM D3359 test method, a crosscut grid of scribe lines 1 mm apart was cut into the coating through to the substrate. Standard adhesive tape as defined by ASTM D 3359 was then applied to the grid and peeled back at 180° angle. Adhesion was determined by the amount of coating removed by the tape. Also, optical microscope evaluation (×6) of cross-hatch region was performed and found to be very informative. In the bend test, 90° bend of a coated panel around a 0.22" diameter mandrel was performed followed by evaluation of the area around the bend for any defects such as cracking, peeling or delamination. All tested chromate-free coating systems of the present invention demonstrated excellent cross-hatch adhesion with the highest 5B rating; no coating cracking or delamination was observed in the bend tests.

As will be shown and discussed below in the Examples, the inventors have carried out extensive experiments to evaluate functional performance of the protective coating systems of the present invention. In particular, a battery of specific, rather demanding tests was performed to demonstrate suitability of these coatings for protection of various gas turbine engine parts. Typically, requirements for turbine compressor coating applications include relatively high corrosion resistance; sacrificial toward base metal (i.e., coated and scribed "X" panels should not show any metal substrate rusting for at least 1,000 hrs in accordance with the ASTM B117 Salt Spray test); heat oxidation resistance; as well as resistance to corroding under combined, cyclic exposure to heat and Salt Spray. Additionally, the coatings should not deteriorate, (i.e. not develop blisters or red rust corrosion in cyclic exposure to heat, humidity and Salt fog). Still further, the coatings should be resistant to hot water and engine fluids exposure.

The test matrix employed by the inventors for testing of the functional performance of the coating systems of the present invention is summarized in Table 3. As will be shown in the Examples below, the coating systems derived from Cr (VI)-free slurries of the present invention are capable of meeting and exceeding these demanding requirements. Furthermore, the slurries of the present invention perform on par with the benchmark Cr (VI) containing coating SermeTel W® and outperform various other prior art Cr-free coatings that were tested.

TABLE 3

Functional performance tests of the chromate-free coating systems

| Test type | Duration | Substrate |
|---|---|---|
| Salt Spray | Up to 2,500 hrs | 1010 |
| Boiling H2O (adhesion & Bend) | 10 min | 1010 |
| Bend (90° on 0.22" mandrel) + Salt Spray | 1,300 hrs | 1010 |
| Heat 700° F./23 hrs + 1075° F./4 hrs | 23 hrs + 4 hrs | 1010, 4130 |
| 700 F.°/23 hrs + 1075° F./4 hrs + Spray | 400 hrs | 1010, 4130 |
| Heat 850 F.° + Salt Spray | 10 cycles | 1010, 4130, 410 |
| Heat 850 F.° + Salt Spray + 96% Humidity | 10 cycles | 1010, 4130, 410 |
| Dry heat oxidation resistance 850° F. | 250 hrs | 410, 4130 |
| Dry heat oxidation resistance 1100° F. | 1000 hrs | 410, 4130 |
| Lubricating Oil 300° F. | 100 hrs | 1010 |
| Engine fuel 160° F. | 100 hrs | 1010 |
| Hydraulic fluid 160° F. | 3 hrs | 1010, 4130, 410 |

Salt Spray testing of scribed coatings on 1010 low-carbon steel panels was performed per ASTM B117 for at least 1000 hours, and in some cases for up to 2,500 hours. Long-term dry heat oxidation resistance of the coatings on low-alloy 4130 and stainless 410 steel panels was tested at 850° F. and at 1100° F. for up to 1000 hrs. Another heat resistance (700° F./23hrs+1075° F./4 hrs) test combined with Salt spray was performed using post-cured (1000° F./90 min) coatings on 1010 panels. After heat exposure, the coatings were scribed and exposed to Salt Spray (per ASTM B117) for 400 hrs.

In the cyclic heat and Salt Spray test, the coated panels were heated at 850° F. for 2 hours, then cooled to a room temperature and placed into Salt fog for 20.0 hours. Another variation of this test cycle constituted 7.5 hours of heating followed by 15.5 hours of Salt fog exposure. The samples were rinsed with de-ionized $H_2O$ and dried prior to performing the next thermal part of the cycle. A total of 10 cycles were performed.

Cyclic Salt Spray-Heat-High humidity test was performed as follows. Samples were exposed to a Salt fog for 1 hour; rinsed with DI $H_2O$ dried; then heated at 850° F. for 2 hours; and then cooled to a room temperature and placed into Humidity chamber (96% Humidity, operation per BS3930 part F2) for 20 hours. A total of 10 cycles were performed.

Engine fluids immersion tests (Fuel B, lubricating oil, hydraulic fluid) were performed on coated 1010 panels. Respective immersion temperatures and durations are given in Table 3.

The hot oil resistance test was performed on coated 1010 panels immersed in SAE Di-ester Test Fluid at 400° F. for 8 hrs.

With regards to the hot water resistance test, coatings on 1010 panels were placed in boiling $H_2O$ for 10 min, then cooled and air-dried for 3 hrs, followed by cross-hatch and bend adhesion tests performed as described above.

It is important to emphasize that all chromate-free coating systems of the present invention have passed the boiling water resistance test, which is recognized as a very severe test that uncovers any deficiencies in a coating curing completion, its continuity, sufficiency in pore sealing and coherence. Applicants did not observe any change in visual appearance of the coatings after submersion into boiling H2O. In other words, no blisters, chalking or delamination was observed. Further, no deterioration in cross-hatch adhesion (same 5B rating) was observed, and no coating cracking or delamination was observed in the bend tests. Representative test results will be demonstrated in the Examples below.

While the preferred embodiments of the inventive slurries formulations and coating slurries have been set forth above, the following examples are merely illustrative, and they are not to be construed as limiting the invention.

It should be understood that all the slurries of the present invention were characterized by their pH, viscosity, specific gravity and solids content. These parameters, together with D50 and D90 (that are diameters of $50^{th}$ percentile of the pigment particle size distribution and the $90^{th}$ percentile of the particle size distribution, respectively) were monitored to test stability and aging of the slurries. It was found that the slurries demonstrated good stability and a shelf life of six months and longer.

The same chromate-free basecoat slurry was employed in all Examples; the basecoat slurry was prepared and applied, as described in detail in the parent U.S. application Ser. No. 13/673,007. Two layers of the basecoat were applied, with each layer cured at 650° F. for 30 minutes. The total basecoat thickness employed in the Examples below was in the range from 1.2 to 1.5 mils.

EXAMPLE 1

Top coating slurry A from Table 2 was prepared by mixing of 24 grams of $Cr_2O_3$ green pigment and 2 grams of Cab-O-Sil® M5 fumed silica into 200 grams of aluminum phosphate binder with a molar ratio $Al:PO_4$=2.7 and pH=1.8. The binder also contained 3.5 grams of $B_2O_3$. Slurry A also had a final pH=1.8, with the pigment particle size in the slurry being characterized as D50 of about 5 micron and D90 of about 8 micron.

Prior to the application of the top coating, a step of burnishing the basecoat with $Al_2O_3$ abrasive media (to activate the basecoat and thus to make it sacrificially protective against corrosion) was carried out. The burnishing was carried out by two different routes. A first group of the panels was burnished after the first cured layer of the basecoat (i.e. Class 3 activated basecoat). A second group of panels was burnished after the second cured layer of the basecoat (Class 4 activated basecoat). After formation of the Class 3 and Class 4 activated basecoats, the top coat Slurry A was spray applied onto the surface of the basecoats. The sprayed layer was dried at 175° F. for 15 minutes and then cured at 650° F. for 30 minutes. Total thickness of the basecoat+top coat A coating system was determined to be in the range from 1.4 to 1.7 mils.

Figure 2A:
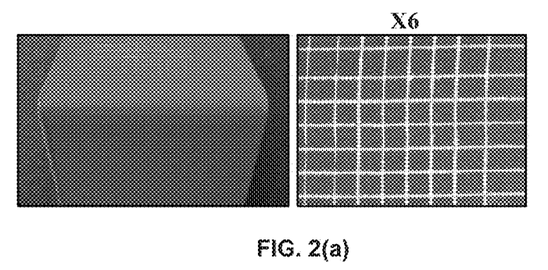
FIGS. 2(a) and 2(b) generally show chromate-free coating system of the present invention with Top coating A after Boiling water exposure, followed by bend and cross-hatch adhesion (magnification ×6) tests, and more particularly.
Figure 2B:
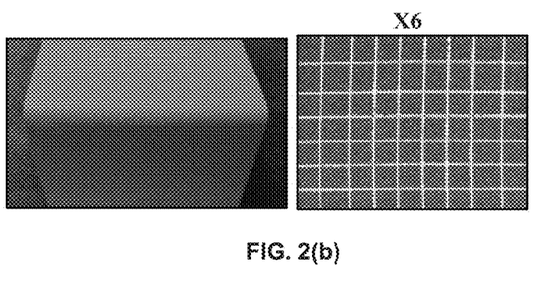

The coated panels from both Class 3 and Class 4 were submerged into boiling water for 10 minutes, and then dried and inspected visually. No signs of coating deterioration, such as blisters or delamination, and no loss of color or signs of chalking were detected. After about 12 hours, the same panels were tested by cross-hatch and bend tests. According to the results (FIGS. 2a and 2b), the coating system with Top coat A of the present invention preserved excellent adhesion to the substrate and interlayer adhesion.

The coated panels from both Class 3 and Class 4 were scribed and then subjected to the Salt Spray test for about 1000 hours. No red rust in the scribe or in the field was observed.

Figures 3A, 3B, 3C:
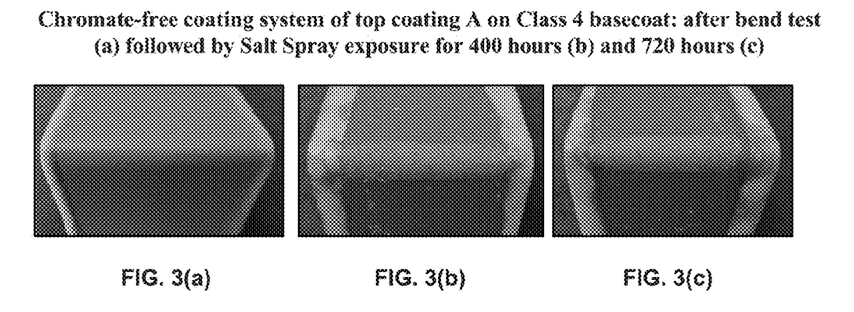
FIGS. 3(a) through 3(c) show chromate-free coating system of the present invention with Top coating A: 3(a) shows results of a bend test of the as-cured coating, 3(b) shows results of the bend test followed by 400 hours of the Salt spray exposure and 3(c) shows results of a bend test followed by 720 hours of the Salt spray exposure (per ASTM B117)

Another corrosion resistance test was designed specifically by the inventors to investigate if the coating system is capable of resisting corrosion in the areas endured a stress deformation. This test was performed on the panels that were first subject to bending over a 0.22" mandrel, and then exposed to the Salt fog for about 700 hours. Both Group 1 and Group 2 coating systems passed this test without any signs of red rust observed to be developing at the bend (FIG. 3a through 3c).

EXAMPLES 2-3

Figure 4A:
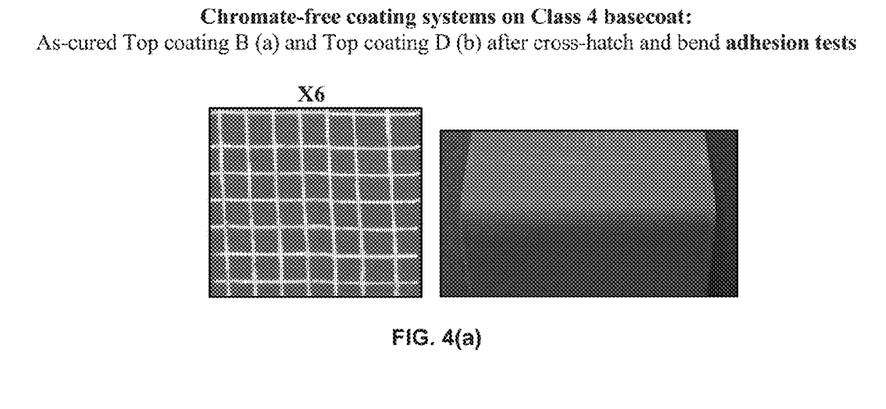
FIGS. 4(a) and 4(b) show as-cured chromate-free coating systems of the present invention after adhesion tests: 4(a) shows cross-hatch at a magnification of ×6 and bend test for the coating system with Top coating B and 4(b)—for the coating system with Top coating D.
Figure 5A:
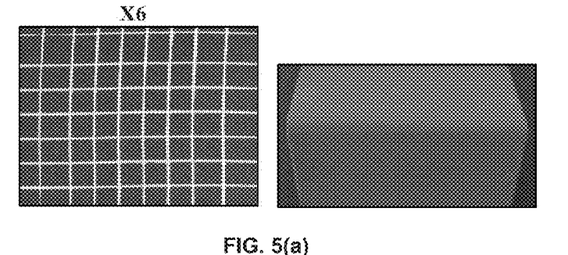
FIGS. 5(a) and 5(b) show results of adhesion tests of chromate-free coating systems of the present invention after Boiling water exposure: 5(a) shows cross-hatch at a magnification of ×6 and bend test for the coating system with Top coating B and 5(b)—for the coating system with Top coating D.

In Example 2, the top coating Slurry B from Table 2 was prepared by mixing of 24 grams of $Cr_2O_3$ green pigment and 2 grams of Aeroxide® fumed $TiO_2$ into 200 grams of aluminum phosphate binder with a molar ratio Al:PO4=1: 2.4 and pH=1.47. The binder also contained 3.0 gram of $B_2O_3$. Slurry B had a final pH =1.5 with the pigment particle size in the slurry characterized as D50 of about 4.0-4.5 micron, and D90 of about 8 microns. The slurry B was spray applied on the surface of the chromate-free basecoat; the burnishing step with Al2O3 grit was performed after the second cured layer of the basecoat. The sprayed layer of Slurry B was dried at 175° F. for 15 minutes and then cured at 650° F. for 30 minutes followed by post-curing at 1000° F. for 60 minutes. Total thickness of the basecoat+top coat B coating system was determined to be in the range from 1.4 to 1.7 mils, with the basecoat having a thickness of 1.2-1.5 mils and the top coating have a thickness of 0.1-0.3 mils. The coatings exhibited excellent adhesion to all tested substrates (see adhesion test results on FIG. 4a). A notable observation was that subjecting the coated panels to the Boiling water test did not cause any deterioration of the tested coating system (FIG. 5a).

Figure 4B:
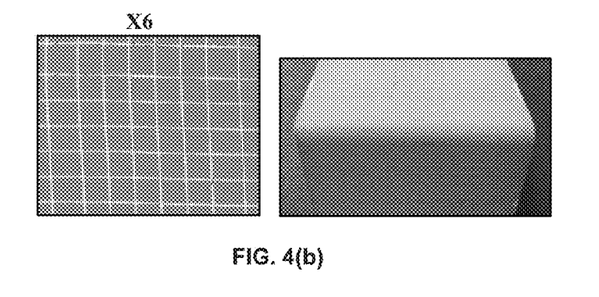
Figure 5B:
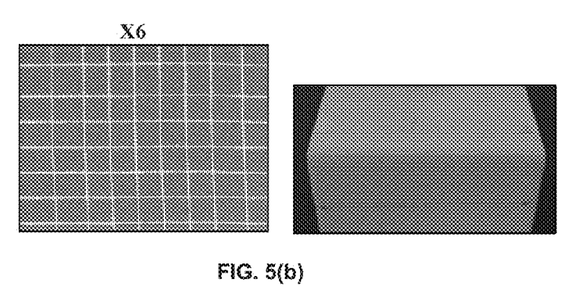

In Example 3, top coating slurry D from Table 2 was prepared by mixing of 18 grams of titanium dioxide white pigment $TiO_2$, and 2 grams of Aeroxide® fumed $TiO_2$ into 200 grams of aluminum phosphate binder with a molar ratio Al:PO4=1:2.4. The binder also contained 3.0 gram of $B_2O_3$. Slurry D had a final pH =1.5 with the pigment particle size in the slurry being characterized as D50 of about 2.5-3.2 microns and D90 of about 4-5 microns. Top coat from Slurry D was applied, dried and cured in the same manner as the layer designated as Slurry B of Example 2. The coatings exhibited excellent adhesion to all tested substrates (FIG. 4b), and as with the other chromate-free coating systems of the present invention, subjecting the coated panels to the Boiling water test did not cause any deterioration of the coating system with the top coat D (FIG. 5b).

Results of the functional performance testing of the coating systems described in Examples 2-3 are summarized in Table 4, and representative test coating samples are presented in the FIGS. 6 through 11.

TABLE 4

| Test type | Results |
|---|---|
| Salt Spray 2,500 hrs | No red rust in the field or scribe, no blistering |
| Bend (90°) + Salt Spray 1,300 hrs | No red rust on the bend |
| Heat 700° F./23 hrs + 1075° F./4 hrs + Salt Spray 400 hrs | No delamination, coatings preserve initial color No red rust in the field or scribe, no blistering |
| 10 cycles of Heat 850° F. + Salt Spray | No red rust in the field or scribe, no blistering |
| 10 cycles of 850° F. + Salt Spray + Humidity | No red rust in the field or scribe, no blistering |
| Heat oxidation resistance 1100° F./1,030 hrs | No delamination, coatings preserve initial color |
| Lubricating Oil Royco 500 300° F./100 hrs | No delamination, no blistering or chalking |
| Engine Fuel B 160° F./100 hrs | No delamination, no blistering or chalking |
| Hydraulic fluid Skydrol 500 160° F./3 hrs | No delamination, no blistering or chalking |

Figure 6A:
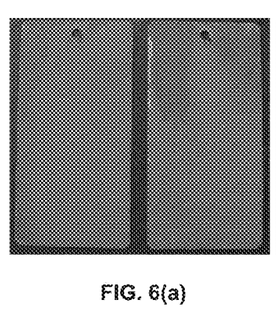
FIGS. 6(a) through 6(c) show salt spray test results for the chromate-free coating system of the present invention with Top coating B after 1100, 1700 and 2500 hours of exposure.
Figure 6B:
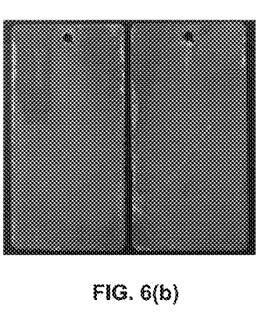
Figure 6C:
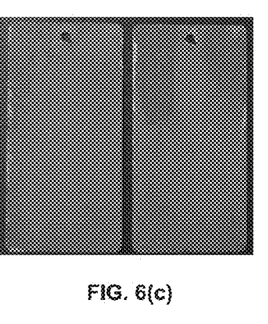
Figure 7A:
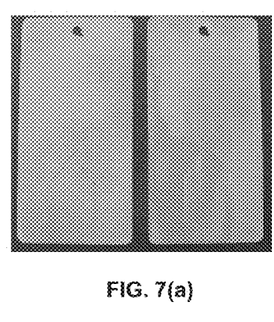
FIGS. 7(a) through 7(c) show salt spray test results for the chromate-free coating system of the present invention with Top coating D after 1100, 1700 and 2500 hours of exposure.
Figure 7B:
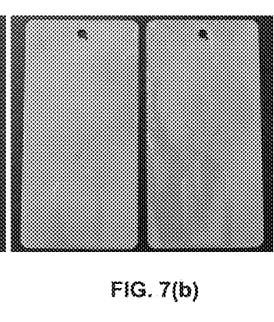
Figure 7C:
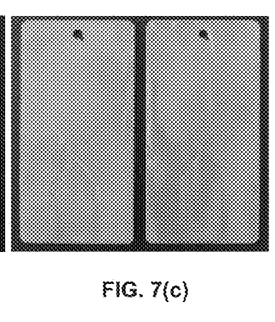

Testing results demonstrated excellent corrosion stability for up to 2,500 hours of testing of the developed chromate-free coating systems: all tested panels were observed to be completely free of red rust formation in the field and scribe (FIGS. 6 and 7, a through c).

Additionally, a corrosion resistance test was performed on the panels that were first subjected to bending over 0.22" mandrel and then exposed to the Salt fog for 1,260 hours: both coating systems of Examples 2 and 3 passed this test without any signs of red rust developing at the bend, i.e. in the area that endured stress deformation.

Figure 8A:
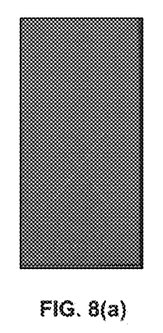
FIGS. 8(a) and 8(b) show results of cyclic heat+salt spray test results after ten cycles for the chromate-free coating system of the present invention with Top coatings A and D.
Figure 8B:
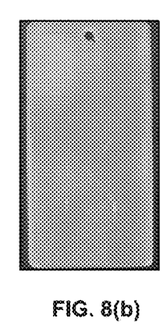
Figure 9A:
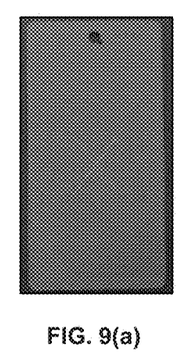
FIGS. 9a and 9(b) show results of cyclic heat+salt spray+ high humidity test after ten cycles for the chromate-free coating system of the present invention with Top coatings A and D.
Figure 9B:
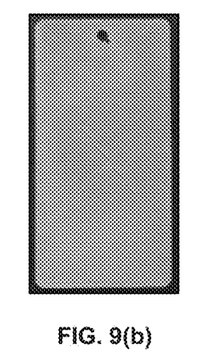

Two different cyclic tests were performed (Table 4). A cyclic heat test and a Salt Spray test were performed on the coated and scribed panels (low carbon steel and 410 stainless steel substrates). The results indicated no red rust development in the scribe and field after ten cycles of heating at 850° F./2 hrs, followed by exposure to a salt fog for at least 20 hrs (FIGS. 8, a and 8b). Both coating systems also passed another demanding cyclic test of 10 cycles in the Salt Spray-Heat-98% humidity exposure (FIGS. 9a and 9b).

Figure 10A:
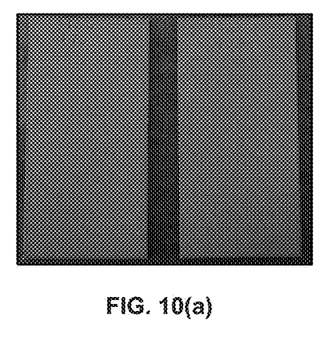
FIGS. 10(a) and 10(b) show results of heat oxidation resistance test for the chromate-free coating system of the present invention with Top coatings A and D after exposure to 1100° F. for 1030 hours.
Figure 10B:
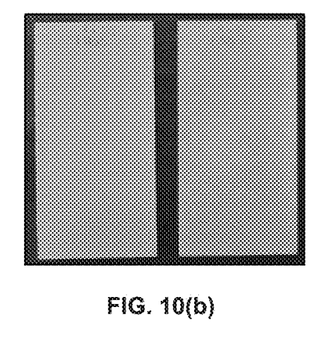
Figure 11A:
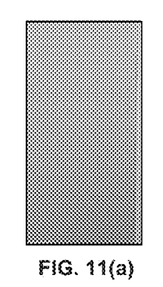
FIGS. 11(a) through 11(f) illustrate influence of molar ratio of $Al:PO_4$ in the top coating binder composition on heat oxidation resistance of the coating systems of the present invention.
Figure 11B:
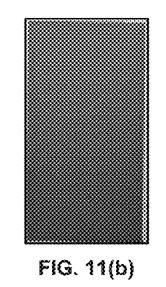
Figure 11C:
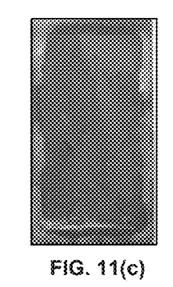
Figure 11D:
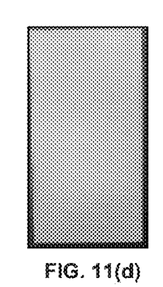
Figure 11E:
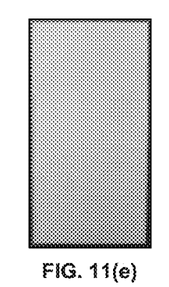
Figure 11F:
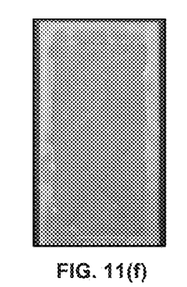

A long-term heat exposure stability test is part of several OEM Specifications, with the most demanding exposure conditions of 1100° F. for 1000 hrs. The coating systems of Examples 2-3 passed this test. No visual deterioration of the coatings (such as spallation, blistering, loss of adhesion) was observed (FIGS. 10a and 10b).

Resistance of the coating systems of Examples 1 through 4 to typical engine fluids, such as Fuel B, Royco 500 lubricating oil and Skydrol 500 hydraulic fluid, was tested and the results were successful. After submerging coated and scribed panels in corresponding fluids at specified exposure temperatures and times (see Table 3 and 4), visual evaluation of the coatings did not reveal any change in appearance. In particular, none of the coating was observed to exhibit delamination; blisters; chalking or loss of adhesion; or rust after exposure.

EXAMPLE 4

Example 4 serves to illustrate influence of Al:PO4 molar ratio of the aluminum phosphate based binder of the top coating slurry on the overall functional performance of chromate-free coating systems of the present invention. Top coating Slurry C from Table 2 was prepared by mixing of 18 grams of titanium dioxide white pigment $TiO_2$ and 2 grams of Aeroxide® fumed $TiO_2$ into 200 grams of aluminum phosphate binder with molar ratio Al:PO4=1:2.7; the binder also contained 3.0 gram of $B_2O_3$. Slurry C had a final pH =1.8 with the pigment particle size in the slurry being characterized as D50 of about 3.0 micron and D90 of about 4.5 micron. The slurry C was spray applied on the surface of the chromate-free basecoat. A burnishing step with Al2O3 grit was performed after the second cured layer of the basecoat. The sprayed layer of Slurry C was dried at 175° F. for 15 minutes and then cured at 650° F. for 30 minutes. Total thickness of the basecoat+top coat C coating system was determined to be in the range from 1.4 to 1.7 mils, with the basecoat having a thickness of 1.2-1.5 mils and the top coating have a thickness of about 0.1-0.3 mils. The coatings exhibited excellent adhesion to all tested substrates. Subjecting the coated panels to the Boiling water test did not cause any deterioration of the tested coating system.

Employing a test matrix of Table 3, the functional performance of the coating system with the top coating C was compared with the performance of the coating system of Example 3 with the top coating D; results of this testing are presented in Table 5 and FIGS. 11(a) through 11(f)

TABLE 5

| Test type | Top coat C Al:PO4 = 1:2.7 | Top coat D Al:PO4 = 1:2.4 |
| --- | --- | --- |
| Salt Spray | Pass | Pass |
| Boiling H2O (adhesion & Bend) | Pass | Pass |
| Bend (90° on 0.22" mandrel) + Salt Spray | Pass | Pass |
| Heat 700 F.°/23 hrs + 1075° F./4 hrs + Salt Spray 400 hrs | Fail | Pass |
| 10 cycles of Heat 850 F.° + Salt Spray | Pass | Pass |
| 10 cycles of Heat 850 F.° + Salt Spray + Humidity | Pass | Pass |
| Dry heat oxidation resistance 850° F. 250 hrs | Pass | Pass |
| Dry heat oxidation resistance 1100° F. 1000 hrs | Fail | Pass |
| Engine fluids | Pass | Pass |

As seen from the results, a major difference between these two coating systems was observed in their heat oxidation resistance. While the coating system with the top coat D (Al:PO4=1: 2.4) demonstrated long term heat oxidation resistance at temperatures as high as 1100° F., top coating C with the lower Al:PO4 ratio of about 1:2.7 was capable of providing long-term heat resistance (250 hours and more) only at lower temperatures up to 900° F. It was determined that the chromate-free coating system of the present invention with the top coating C was capable of withstanding relative short-time temperature spikes above 1000° F. For instance, 4 hours of heat exposure at 1075° F. resulted in significant darkening of the coating but did not lead to coating spallation, as seen on FIG. 11(b). However, the coating corrosion protective properties did deteriorate after 4 hours (i.e., onset of red rust was observed as seen on FIG. 11(c), which was considered a failure in the Salt Spray test). In the same test, the coating system with the top coating D did not show any noticeable change in color after exposure to 1075° F. for four hours and did not develop rust in the Salt Spray test (shown on FIGS. 11e and 11f). Thus, as previously stated in accordance with principles of the present invention, by varying the molar ratio of $Al:PO_4$ in the top coating binder composition, the present invention can control long-term heat oxidation resistance of the coating system whereby the higher $Al:PO_4$ molar ratio results in increased temperature resistance to the coating system.

COMPARATIVE EXAMPLE 1

Figure 12A:
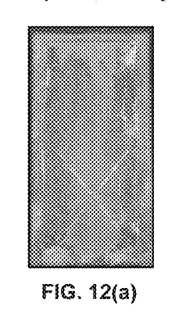
FIGS. 12(a) and 12(b) show salt spray test results for the chromate-free base coating only from U.S. patent application Ser. No. 13/673,007 after 1000 hours and 1700 hours of exposure.
Figure 12B:
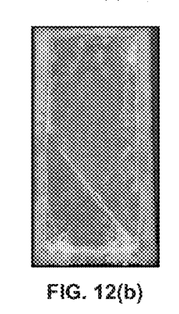

Corrosion resistance of the coating systems comprised by the basecoat of the parent U.S. patent application Ser. No. 13/673,007 and the top coatings derived from the slurries B and D. (FIGS. 6 and 7) was compared with the chromate-free basecoat only coatings of the parent U.S. patent application Ser. No. 13/673,007 (presented in FIGS. 12a and b). Although no red rust developed on the panels with the chromate-free basecoat-only coatings of the parent U.S. patent application Ser. No. 13/673,007 application, nevertheless after prolonged exposure to the Salt fog a presence of significant amounts of so-called "white corrosion" (i.e. products of sacrificial corrosion of the coating) was observed. Such white corrosion can lead to undesirable increase in the coating roughness during service. When the results in FIGS. 12a and 12b are compared with the results in FIGS. 6 and 7, it is evident that incorporation of the top coatings of the present invention to the basecoat of the parent U.S. patent application Ser. No. 13/673,007 eliminated this white corrosion appearance. Rather, very minor visual changes were observed on the coated panels after about 2,500 hours of testing. Thus, it was observed that employing the top coatings allowed enhance corrosion resistance capability of the developed chromate-free coating systems rather significantly in comparison to the chromate-free basecoat only coatings of the parent U.S. patent application Ser. No. 13/673,007 (presented in FIGS. 12a and b).

The invention claimed is:

1. Aqueous slurries compositions for the production of a multilayer coating system on a substrate comprising:
   a basecoat slurry, comprising:
   a binder comprising an aqueous solution of lithium doped potassium silicate, the binder characterized by an absence of chromium; and
   an aluminum or aluminum alloy powder incorporated into the binder, wherein the aluminum or the aluminum alloy powder and the binder are contained as a one-part composition;
   wherein the aluminum or aluminum alloy powder comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns; and
   a topcoat slurry wherein said topcoat slurry comprises an aqueous solution of an aluminum phosphate based binder having a molar ratio of $Al:PO_4$ of higher than about 1:3.

2. The aqueous slurries compositions for the production of a multilayer coating system of claim 1, wherein said topcoat slurry has molar ratio of $Al:PO_4$ in the range from about 1:2.2 to about 1:2.8.

3. The aqueous slurries compositions for the production of a multilayer coating system of claim 1, wherein said topcoat slurry has molar ratio of $Al:PO_4$ in the range from about 1:2.4 to about 1:2.7.

4. The aqueous slurries compositions for the production of a multilayer coating system of claim 1, wherein said aluminum phosphate based binder comprises aluminum dihydrogen phosphate.

5. The aqueous slurries compositions for the production of a multilayer coating system of claim 1, wherein said topcoat slurry further comprises metallic oxide particles.

6. The aqueous slurries compositions for the production of a multilayer coating system of claim 1, wherein said basecoat slurry contains the lithium doped potassium silicate and aluminum or aluminum alloy powder in a weight ratio of about 0.18:1 to 0.46:1 silicate to aluminum or aluminum alloy powder.

7. The aqueous slurries compositions for the production of a multilayer coating system of claim 1, wherein said basecoat slurry contains aluminum or aluminum alloy powder between about 35-45 weight percent (wt %) based on the total weight of the slurry and the silicate to aluminum is contained in a ratio of about 0.22:1 to 0.37:1 by weight.

8. Aqueous slurries compositions for the production of a multilayer coating system on a substrate comprising:
a basecoat slurry, comprising:
    a binder comprising an aqueous solution of lithium doped potassium silicate, the binder characterized by an absence of chromium; and
    an aluminum or aluminum alloy powder incorporated into the binder, wherein the aluminum or the aluminum alloy powder and the binder are contained as a one-part composition;
    wherein the aluminum or aluminum alloy powder content in the slurry is between about 30-50 weight percent (wt %) based on the total weight of the slurry and further comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns and
a topcoat slurry, wherein said topcoat slurry comprises an aqueous solution of an aluminum phosphate based binder having a molar ratio of Al:PO$_4$ of higher than about 1:3.

9. The aqueous slurries compositions for the production of a multilayer coating system of claim 8, wherein said topcoat slurry has molar ratio of Al:PO$_4$ in the range from about 1:2.2 to about 1:2.8.

10. The aqueous slurries compositions for the production of a multilayer coating system of claim 8, wherein said topcoat slurry has molar ratio of Al:PO$_4$ in the range from about 1:2.4 to about 1:2.7.

11. The aqueous slurries compositions for the production of a multilayer coating system of claim 8, wherein said aluminum phosphate based binder comprises aluminum dihydrogen phosphate.

12. The aqueous slurries compositions for the production of a multilayer coating system of claim 8, wherein said topcoat slurry further comprises metallic oxide particles.

13. The aqueous slurries compositions for the production of a multilayer coating system of claim 8, wherein said basecoat slurry contains the lithium doped potassium silicate and aluminum or aluminum alloy powder in a weight ratio of about 0.18:1 to 0.46:1 silicate to aluminum or aluminum alloy powder.

14. The aqueous slurries composition for the production of a multilayer coating of claim 8, wherein said basecoat slurry contains aluminum or aluminum alloy powder between about 35-45 weight percent (wt %) based on the total weight of the slurry and the silicate to aluminum is contained in a ratio of about 0.22:1 to 0.37:1 by weight.

15. Aqueous slurries compositions for the production of a multilayer coating system on a substrate, comprising:
a basecoat slurry, comprising:
    a binder comprising an aqueous solution of lithium doped potassium silicate, the binder characterized by an absence of chromium; and
    an aluminum or aluminum alloy powder incorporated into the binder, wherein the aluminum or the aluminum alloy powder and the binder are contained as a one-part composition;
    wherein the lithium-doped potassium silicate comprises potassium and lithium in a ratio of about 3:1 to 20:1 by weight as K$_2$O:Li$_2$O, and further wherein the ratio of silicate to potassium is in a ratio of about 2:1 to 3:1 by weight as SiO$_2$:K$_2$O; and
a topcoat slurry, wherein said topcoat slurry comprises an aqueous solution of an aluminum phosphate based binder having a molar ratio of Al:PO$_4$ of higher than about 1:3.

16. The aqueous slurries compositions for the production of a multilayer coating system of claim 15, wherein said topcoat slurry has molar ratio of Al:PO$_4$ in the range from about 1:2.2 to about 1:2.8.

17. The aqueous slurries compositions for the production of a multilayer coating system of claim 15, wherein said topcoat slurry has molar ratio of Al:PO$_4$ in the range from about 1:2.4 to about 1:2.7.

18. The aqueous slurries compositions for the production of a multilayer coating system of claim 15, wherein said aluminum phosphate based binder comprises aluminum dihydrogen phosphate.

19. The aqueous slurries composition for the production of a multilayer coating of claim 15, wherein said topcoat slurry further comprises metallic oxide particles.

20. The aqueous slurries compositions for the production of a multilayer coating system of claim 15, wherein said basecoat slurry contains the lithium doped potassium silicate and aluminum or aluminum alloy powder in a weight ratio of about 0.18:1 to 0.46:1 silicate to aluminum or aluminum alloy powder.

21. A multilayer coating substrate, comprising:
a substrate,
a basecoat on said substrate, comprising:
    a ceramic matrix not containing chromium, said matrix formed by a silicate binder and a plurality of aluminum powder particles embedded within said matrix;
    wherein said silicate binder is potassium silicate doped with lithium;
    wherein the aluminum powder comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns; and
a topcoat on said basecoat comprising a matrix formed by curing an aluminum phosphate based binder having a molar ratio of Al:PO$_4$ of higher than about 1:3.

22. The multilayer coating composition of claim 21, wherein said topcoat further comprises metallic oxide particles embedded in the matrix.

23. A multilayer coating substrate comprising:
a substrate,
basecoat on said substrate, comprising:
    a ceramic matrix not containing chromium, said matrix formed by a silicate binder and a plurality of aluminum powder particles embedded within said matrix;
    wherein said silicate binder is potassium silicate doped with lithium;

wherein the aluminum powder comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns; and a topcoat on said basecoat comprising a matrix formed by curing an aluminum phosphate based binder having a molar ratio of $Al:PO_4$ of higher than about 1:3.

24. The multilayer coating composition of claim 23, wherein said topcoat further comprises metallic oxide particles embedded in the matrix.

* * * * *